United States Patent [19]
Dimas

[11] Patent Number: 5,415,782
[45] Date of Patent: May 16, 1995

[54] METHOD FOR THE ALTERATION OF SILICEOUS MATERIALS FROM BAYER PROCESS LIQUORS

[75] Inventor: Peter A. Dimas, Wheaton, Ill.

[73] Assignee: Nalco Chemical Company, Naperville, Ill.

[21] Appl. No.: 156,221

[22] Filed: Nov. 22, 1993

[51] Int. Cl.$^6$ ................................. C01F 7/02
[52] U.S. Cl. ........................... 210/698; 210/701; 210/734; 210/735; 210/736; 423/121; 423/122; 423/130
[58] Field of Search ................ 210/698–701, 210/725, 727, 728, 734, 735, 736; 423/121, 122, 130

[56] References Cited
U.S. PATENT DOCUMENTS

| | | | |
|---|---|---|---|
| 4,532,047 | 7/1985 | Dubin | 210/698 |
| 4,578,255 | 3/1986 | Roe et al. | 423/121 |
| 4,902,425 | 2/1990 | Keeney | 423/130 |
| 5,133,874 | 7/1992 | Spitzer et al. | 423/130 |
| 5,284,634 | 2/1994 | Strominger et al. | 423/130 |
| 5,286,391 | 2/1994 | Malito et al. | 210/733 |
| 5,314,626 | 5/1994 | Dimas | 210/696 |

Primary Examiner—Peter A. Hruskoci
Attorney, Agent, or Firm—Robert A. Miller; James J. Drake

[57] ABSTRACT

Siliceous materials produced by thermally treating spent Bayer process liquors are obtained in modified form when produced in the presence of polymeric quaternary ammonium compounds, polyamine polymers, copolymers of acrylic acid and acrylamide, and polyacrylamides. These modified siliceous materials possess morphologies which confer upon them a reduced tendency to deposit on surfaces throughout the process.

5 Claims, 8 Drawing Sheets

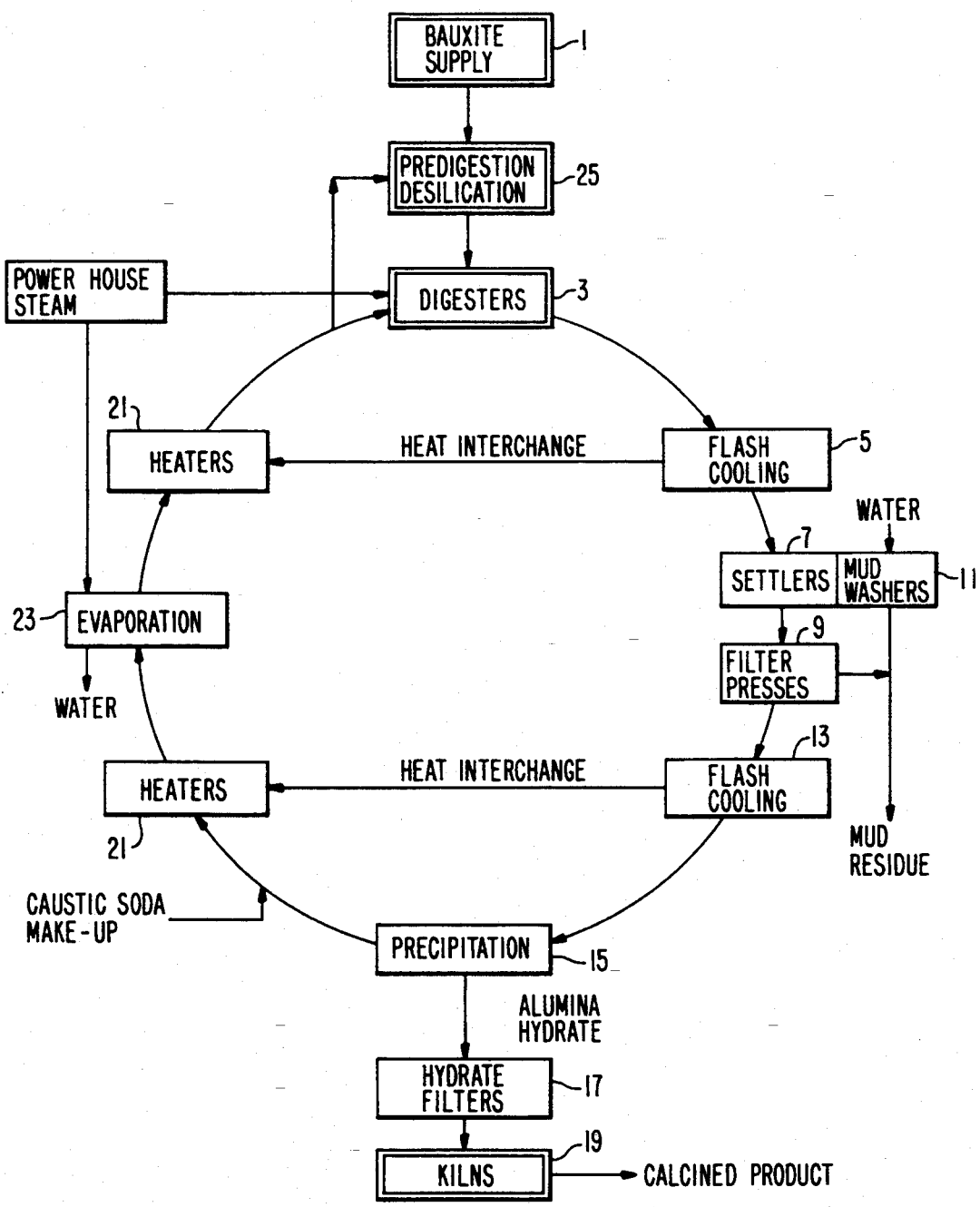

METHOD FOR THE ALTERATION OF SILICEOUS MATERIALS FROM BAYER PROCESS LIQUORS

BACKGROUND OF THE INVENTION

Alumina trihydrate (also known as aluminum hydroxide, alumina, and gibbsite) is produced on an industrial scale in the Bayer process. As shown in FIG. 8, in this process, a raw ore 1 commonly known as bauxite is contacted with hot caustic soda solution in the digesters 3. This results in the dissolution (digestion) of a considerable portion of the aluminum-bearing minerals, affording a supersaturated solution of sodium aluminate (pregnant liquor) which is flash cooled in flash coolers 5. The cooled pregnant liquor is physically separated from the undigested minerals and other solids in settling tanks 7 and filter presses 9. After the solids are removed from the pregnant liquor, the liquor is again cooled in a flash cooler 13. After the physical separation of undigested mineral residues (red mud) 11, the sodium aluminate solution is precipitated 15 to afford alumina trihydrate, which is recovered by filtration 17 and calcined 19 in a kiln. This precipitation step is promoted by the addition of fine alumina trihydrate seed crystals. The remaining liquor is referred to as depleted or "spent liquor". The depleted or spent liquor is free of suspended solids. After the precipitation step, the spent liquor is then recycled extensively, accumulating a variety of dissolved inorganic and organic species over time. During the recycle loop of the process, the spent liquor is heated by heaters 21 and concentrated in evaporator 23. The spent liquor is recycled into the digestion tanks.

The bauxite ores used in this process are found in many parts of the world, and the composition of the ore varies from one location to the next. Generally, bauxites are composed of mixtures of inorganic minerals including oxides and hydroxides of the elements aluminum, iron, titanium and silicon, silicates and aluminosilicates (clays), and organic matter.

During the digestion of bauxite ore, the attack of caustic soda on certain silica-bearing components in the ore results in the release of soluble silicate species into the liquor. These soluble silicates then react with alumina and soda to form insoluble sodium aluminosilicates which are also known as desilication products, or DSP.

Silica present in bauxite as clays is particularly susceptible to dissolution by caustic attack. Silica in this form can constitute as much as 5% of the total mass of the bauxite. Silica present as quartz is more resistant to caustic attack and dissolution, and can constitute as much as 10% of the total mass of the bauxite.

The chemical composition of desilication products can vary from one plant to the next owing to differences in plant operating conditions and liquor chemistry. Furthermore, desilication product compositions can vary within a particular plant, depending on the processing temperature and chemical composition at any given point. Nevertheless, many of the desilication products described in the literature conform approximately to the general formula for the sodalite family of minerals:

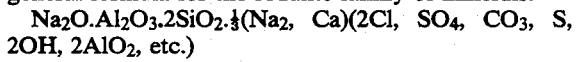

Sodalite itself is the chloride mineral, whereas the sulfate and carbonate forms are known as noselite and cancrinite, respectively. Quite often, desilication product samples are found to be physical mixtures of several of these compounds. Deviations from the stoichiometry of the general sodalite formula are commonly observed. For example, deficiencies in the amount of soda compared with that expected for a true sodalite have been attributed to the replacement of sodium by hydrogen from wash water.

Much of the desilication product exits the plant in the red mud, but a significant portion of soluble silica remains in the pregnant liquor. A small but significant amount of this silica appears as a contaminant in the alumina trihydrate. Furthermore, desilication product is deposited as scale on the walls of pipes and vessels in the recycle loop of the plant which includes heaters 21 and evaporators 23. Scaling by DSP is particularly severe on heated equipment surfaces, such as heat exchanger tubes in heaters 21. The invention encompasses a method of reducing the formation of insoluble siliceous deposits upon Bayer process equipment during the thermal treatment of spent Bayer process liquor.

The presence of large quantities of soluble siliceous species in spent Bayer liquors and their subsequent transformation into insoluble desilication products is detrimental to the operation of the Bayer process, and therefore, undesirable for several reasons. From the general sodalite formula, it is evident that potentially saleable alumina and costly soda are diverted into desilication products. As the recovery of the alumina and soda is not economically viable, these diversions constitute substantial process losses which are economically significant on an industrial scale. Furthermore, the deposition of desilication products on process equipment surfaces such as on the walls of heat exchanger tubes and pipes reduce their operating efficiencies. For example, the flow of fluids through pipes can be impeded by the accumulation of desilication products as scale on the pipe walls, In heat exchangers, scaling of the tubing walls by desilication products can seriously impede the transfer of heat from the steam side which furnishes heat, to the process liquor which is being heated. The removal of such scales is accomplished by manual and/or chemical means, both of which constitute additional costs to the plant.

The negative impact of desilication products on alumina quality and on Bayer Process efficiency and economics has prompted alumina producers to devise methods for mitigating these detrimental effects.

Much effort has been directed at developing processing methods, which are practiced in conjunction with the digestion of bauxite and which promote the dissolution of the siliceous constituents of bauxite and the subsequent precipitation of desilication products to the greatest extent possible. By depleting the liquor of silica at this stage, the potential for scaling downstream is thereby reduced. For example, the temperature or time of digestion may be increased to promote the desilication reactions. In addition, low-silica bauxites may be subjected to a predigestion desilication step 25 in which the concentrated spent liquor slurry of ground bauxite is held at close to atmospheric boiling temperature for periods of 8-24 hours. By this method, fine, high-surface area desilication product seed is formed. When combined with the main digestion slurry, this seed is very effective in promoting the crystallization of desilication product. To raise the concentration of silica above the supersaturation level beyond which desilication products will form, it may also be necessary to add a clay or other siliceous materials in the digestion or predigestion desilication steps. These methods have been summarized in articles such as "Control of Silica in the Bayer Process Used For Alumina Production," S. Ostap, Canadian Metallurgical Quarterly, Vol. 25, No. 2, pp. 101–106.

In addition, a wide variety of inorganic salts and compounds, such as oxides, hydroxides, silicates, aluminates, and other forms of calcium, magnesium, and barium have been employed to control desilication of Bayer liquors.

The use of organic treatments to control deposition of desilication products on equipment surfaces is a relatively unexplored area. A hydrophobic organosilicon liquid polymer has been reported to inhibit the formation of scales during heating and evaporation of aluminate liquors (Kazakov, V. G., Potapov; N. G.; Bobroy, A. E., Tsvetn. Met,, 1979, (1), 45–48). The same treatment method is reported in Wang, Yajun; Ke, Jiajun, Huagong Yejin, 9(4), 66–72, 1988.

The use of additives to render equipment surfaces resistant to scale adhesion in slurry heat exchangers conveying bauxite ore slurries is mentioned in Liu, Zigao; Huagong Yejin, 11(4), 326–32, 1990.

None of the art with which the applicant is familiar discloses the use of specific classes of polymeric organic nitrogenous compounds to modify the morphology of desilication products and thereby reduce their tendency to adhere to equipment surfaces. Nor is there art that indicates the stabilization of siliceous species in spent Bayer liquor by polyacrylamide, acrylamide/acrylic acid copolymers, polymeric quaternary ammonium compounds or polyamine compounds, or any other treatment type.

SUMMARY OF THE INVENTION

One aspect of the present invention provides a method for treating spent Bayer Process liquor containing siliceous components. The method includes the step of adding to the spent liquor a composition including at least one polymer selected from the group consisting of polyacrylamide, acrylic acid/acrylamide copolymers, polyamine polymers and polymeric quaternary ammonium compound. The polymer is added to the spent liquor in a concentration of from 10 to 10,000 parts per million of the liquor.

Preferably, the polyamine compound or polymeric quaternary ammonium compound is one polymer selected from the group consisting of the polymeric reaction products of: ethylenedichloride and ammonia, including the associated methyl chloride and dimethyl sulfate quaternary amine salts (QUATS); epichlorohydrin (EPI) and dimethylamine (DMA), including the associated methyl chloride QUATS or methyl sulfate QUATS; epichlorohydrin, dimethylamine and ethylenediamine, including the associated methyl chloride or methyl sulfate QUATS; epichlorohydrin, dimethylamine and ammonia, including the associated methyl chloride or methyl sulfate QUATS; epichlorohydrin, dimethylamine and hexamethylenediamine, including the associated methyl chloride or methyl sulfate QUATS; triethanolamine (TEA) condensate products, including the associated methyl chloride or methyl sulfate QUATS; the acrylamide copolymer of one or more of the following monomers:

a. Methacrylamidopropyltrimethylammonium chloride (MAPTAG)
b. Dimethylaminoethylmethacrylate methyl sulfate QUAT (DMAEM.MSQ)
c. Dimethylaminoethylmethacrylate methyl chloride QUAT (DMAEM.MCQ)
d. Diallyldimethylammonium chloride (DADMAC)
e. Dimethylaminoethylacrylate methyl chloride quat (DMAEA.MCQ)
f. Dimethylaminoethylacrylate methyl sulfate quat (DMAEA.MSQ); DADMAC homopolymers (POLYDADMAC) and copolymers.

Acrylamide homopolymers (polyacrylamides) and copolymers are also useful in the practice of the invention.

Another aspect of the invention provides a method of reducing the formation of insoluble siliceous deposits upon Bayer Process equipment during a thermal treatment of a spent Bayer Process liquor, the method comprising the step of adding to the spent liquor prior to or during the thermal treatment at least one compound selected from the group consisting of polyacrylamide, acrylamide copolymers, polymeric quaternary ammonium compounds and polyamine compounds in a concentration of from 50 to 10,000 parts per million of the liquor.

BRIEF DESCRIPTION OF THE DRAWINGS

FIG. 8 is a schematic representation of a Bayer process.

DESCRIPTION OF THE PREFERRED EMBODIMENTS

Figure 1:
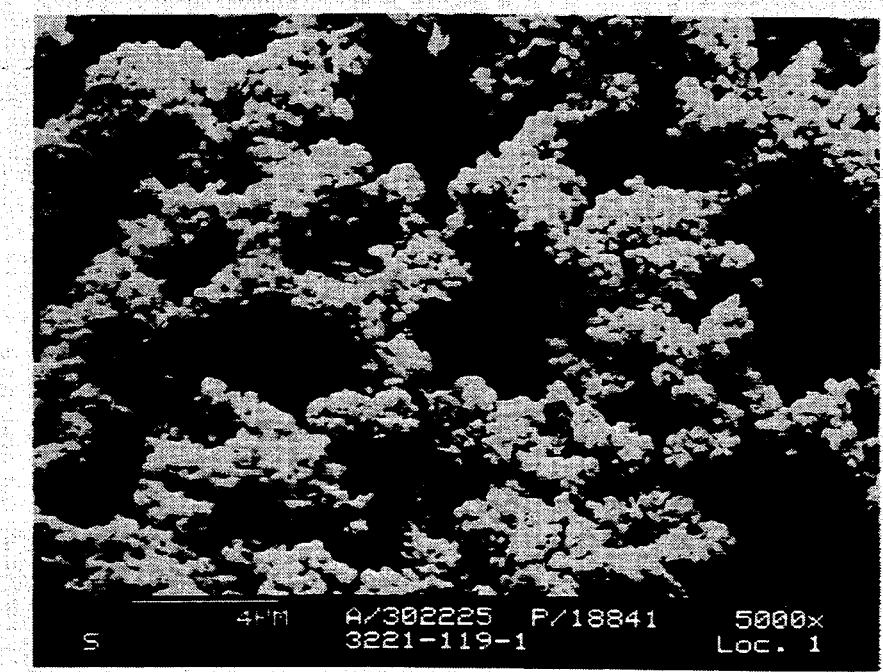
FIG. 1 is electron micrographs of desilication product crystals from precipitation studies conducted without additives and no $SiO_2$ spike at 5,000 times magnification.

The present invention provides a method for modifying the composition, the morphology, and the texture of Bayer desilication products. The Bayer desilication products of the invention have a reduced tendency to adhere to process equipment surfaces.

It has been surprisingly discovered that the solubility, morphology and texture of the insoluble desilication products formed in the presence of any of the polymeric compounds of the invention are altered from that of the untreated desilication products. With regard to morphology, these altered desilication products exhibit rounder shapes and smoother surfaces relative to untreated samples. Such modifications of these siliceous particles are expected to coffer upon them a reduced tendency to adhere to process equipment surfaces. It is also believed that inorganic scale is affected by the methods of the present invention.

According to the invention, at least one polyacrylamide, acrylamide/acrylic acid copolymer, polyamine polymers and/or polymeric quaternary ammonium compound is added to spent Bayer Process liquor to modify the insoluble desilication products as they form. Spent liquor is free of organic and inorganic solids (Red Mud). It is believed that, in part, the invention provides its surprising and unexpected results in spent liquor, since spent liquor is free of organic and inorganic solids (red mud) which would interfere with the chemical and physical interaction between the polymeric compounds of the invention and the siliceous materials in the spent liquor.

Polyacrylamide, acrylamide copolymers, polyamine and polymeric quaternary ammonium compounds have been demonstrated to be highly effective in altering the morphology and texture of desilication products produced from spent Bayer liquors. The polymers of the invention are preferably added to the spent liquor as an aqueous solution in an effective dosage, although addition in an organic solvent, such as methanol, or addition as a solid is acceptable. For purposes of the invention, the term "effective dosage" is that dosage of the polymeric compound which induces the formation of insoluble desilication products from spent Bayer liquors having modified morphological and/or chemical properties. Preferably, it is added in an effective dosage range of from about 10 to about 10,000 parts per million, and more preferably, in a range of from 100–5,000 parts per million. According to one embodiment of the invention, the polymers of the invention are added to the spent Bayer Process liquor prior to or during a thermal treatment of the liquor. For purposes of the invention, the term "thermal treatment" means those points of the Bayer process where solids-free (spent) liquor feeds to a heater (such as heater 21 in FIG. 8) or any point thereafter, up to, but not including, digesters (such as digesters 3 in FIG. 8) and predesilication (see 25—FIG. 8) where the reheated liquor is mixed with Bayer process solids (bauxite).

One preferred water-soluble, polymeric quaternary ammonium compound employed in the present invention is a polydiallyl dimethyl ammonium chloride (POLYDADMAC) compound constructed from the monomer diallyl dimethyl ammonium chloride (DADMAC). Polymerization of this monomer may be accomplished by standard vinyl polymerization techniques, but is preferably completed by free radical initiation of this vinylic monomer, in the presence or absence of other vinylic monomers such as acrylamide, methylacrylate, and the like. Polymers of this type are described in Butler, U.S. Pat. No. 3,288,770, which is incorporated herein by reference. Polymerization may be accomplished with the DADMAC monomer alone, leading to homopolymers, or with DADMAC and other vinylic monomers, leading to DADMAC containing copolymers.

The preferred POLYDADMACS to be used in this invention are homopolymers of DADMAC which have an Intrinsic Viscosity of at least 0.1 and preferably have an Intrinsic Viscosity ranging between about 0.3 to about 1.0. As stated previously, POLYDADMAC may also refer to other vinylic polymers containing DADMAC monomer, such as copolymers of DADMAC and acrylamide. When copolymers are used, the Intrinsic Viscosities are at least 0.2 and may range as high as 1.5 or above.

The term "Intrinsic Viscosity" as used herein refers to the viscosity-molecular weight relationship as described in detail in chapter IV of "Polymer handbook", Edited by J. Brandrup and E. H. Immergent, Published by Interscience Publishers, New York, 1966.

Copolymers of acrylamide and acrylic acid are also useful in the practice of the present invention. The weight ratio of acrylamide to acrylic acid ranges between about 20:1 to 1:20 and the molecular weight ranges between about 10,000 and about 25,000,000 daltons. According to one preferred embodiment of the invention, the molecular weight of the acrylamide/acrylic acid copolymer is from about 10,000 to about 100,000 daltons. It has been surprisingly discovered that the acrylamide/acrylic acid polymers of the invention actually stabilize dissolved siliceous materials in the liquor, thus, preventing scaling by DSP.

These acrylic acid/acrylamide copolymers may be added as aqueous solutions. The aqueous solutions being formed by dissolving solid powdered or by dissolving a water-in-oil latex which contains the copolymers and which has previously been described in U.S. Pat. Nos. Re. 28,474 and 28,576, both of which are incorporated herein by reference. Homopolymers of acrylamide (polyacrylamide) are also useful in the practice of the invention. The molecular weight of the polyacrylamide is preferably from 1,000,000 to 25,000,000 daltons.

According to one embodiment of the invention, the polymeric quaternary ammonium compound of the invention is one polymer selected from the group consisting of polymers containing diallyl dimethyl ammonium chloride (DADMAC), methacrylamidopropyl trimethyl ammonium chloride (MAPTAC), dimethyl aminoethyl acrylate and/or its acid salts (DMAEA), dimethylaminoethylmethacrylate (DMAEM), quaternized salts of DMAEA and/or DMAEM, and the like. The invention is not to be limited to the vinyl monomers mentioned above but may include any polymeric quaternary ammonium compound which is synthesized using a vinylic monomer having a substituted nitrogen and which is quaternized with standard quaternizing agents such as dimethyl sulfate, methyl chloride, methyl bromide, and the like.

The polyamine compounds of the invention are preferably chosen from the group consisting of water-soluble or water dispersible condensation polymers which may be formed by condensation polymerization of materials such as epichlorohydrin-dimethylamine, ethylenedichloride-ammonia, ethylene-dichloridemethylamine-ammonia, epichlorohydrin-dimethylamine-ethylene oxidepropylene oxide, aniline-formaldehyde reacted with materials such as epichlorohydrin dimethylamine condensated polymers, or any other condensation polymers which contains epichlorohydrin, dimethylamine, ethylenedichloride, ammonia, methylamine, ethyleneoxide, propyleneoxide, aniline-formaldehyde condensates, or any admixture of the above ingredients, so as to form a condensation polymer which is water-soluble or water-dispersible. The polyamine compounds of the invention preferably have an average molecular weight ranging between about 5,000 to about 250,000 daltons. Ethylenedichloride and ammonia react by a series of ammonolysis and alkylation steps to afford a polymer in which the two-carbon unit of ethylene dichloride and the nitrogen atom of ammonia alternate to form chain, branched, and crosslinked structures. Furthermore, the primary, secondary, and tertiary nitrogen atoms in such structures may be quaternized by standard methods which are known to skilled chemists. These polymers are discussed in detail in U.S. Pat. No. 4,374,964, the disclosure of which is incorporated herein by reference.

More preferably, the polyamine or polymeric quaternary ammonium compound is a hydrophilic alkylene polyamine polyfunctional halohydrin polymer which is the reaction product of an alkylene polyamine with a polyfunctional halohydrin such as dihalohydrin, e.g., alphadichlorohydrin, dibromohydrin, or diiodohydrin, or any of the corresponding monohalohydrins containing a second functional group capable of reacting with an amino nitrogen atom of the alkylene polyamino, such as, for example, epichlorohydrin, epibromohydrin, and the like. It is well-known that halohydrins such as epichlorohydrin may react with an amine, with combinations of several different amines, or with combinations of amines and ammonia to produce polyamines containing alternating nitrogen atoms and halohydrin fragments. The reactions leading to polymer formation are all nucleophilic substitutions of the amines or ammonia onto epoxides or chlorohydrins. These polymers are disclosed in detail in U.S. Pat. No. 4,374,102, the disclosure of which is incorporated herein by reference. The preparation of such materials is also discussed in detail in Canadian Patent No. 731,212, the disclosure of which is incorporated herein by reference.

The relative proportions of the polyamine and polyfunctional halohydrin polymer employed in making the polymers for the purpose of the invention can be varied depending upon the particular types of polyamine and polyfunctional halohydrin and the reaction condition. In general, it is preferable that the molar ratio of the polyfunctional halohydrin to polyamine be in excess of 1:1 and less than 2:1. These polymers may also be quaternized using known methods.

Other polymers which are useful in the practice of the invention include the polymers of the following reactions:

1. Ethylenedichloride and ammonia, including the associated methyl chloride and dimethyl sulfate quaternary amine salts (QUATS);
2. Epichlorohydrin (EPI) and dimethylamine (DMA), including the associated methyl chloride QUATS (MCQ) or methyl sulfate QUATS (MSQ);
3. Epichlorohydrin, dimethylamine and ethylenediarnine, these include the associated methyl chloride or methyl sulfate QUATS;
4. Epichlorohydrin, dimethylamine and ammonia, including the associated methyl chloride or methyl sulfate QUATS;
5. Epichlorohydrin, dimethylamine and hexamethylenediamine, including the associated methyl chloride or methyl sulfate QUATS;
6. Triethanolamine (TEA) condensate products, including the associated methyl chloride or methyl sulfate QUATS; and
7. The acrylamide copolymer of one or more of the following monomers:

a. Methacrylamidopropyltrimethylammonium chloride (MAPTAG)
  b. Dimethylaminoethylmethacrylate methyl sulfate quat (DMAEM.MSQ)
  c. Dimethylaminoethylmethacrylate methyl chloride quat (DMAEM.MCQ)
  d. Diallyldimethylammonium chloride (DADMAC)
  e. Dimethylaminoethylacrylate methyl chloride quat (DMAEA.MCQ)
  f. Dimethylaminoethylacrylate methyl sulfate quat (DMAEA.MSQ)

The triethanolamine condensation products are prepared by the dehydration condensation with or without a catalyst of triethanolamine or acylated triethanolamine, or mixtures of the two monomers. The monomers are linked together by reaction of the hydroxyl groups, with water formed as a by-product. The acylated triethanolamine are derived by combining triethanolamine with a carboxylic acid. The polymers resulting from such dehydration condensation reactions contain a plurality of tertiary amino groups which can be quaternized by standard methods. These polymers are disclosed in U.S. Pat. No. 4,179,396, the disclosure of which is incorporated herein by reference.

In the following examples, illustrations are provided for practicing the invention. The following examples are presented to describe preferred embodiments and utilities of the invention and are not meant to limit the invention unless otherwise stated in the claims appended hereto.

EXAMPLE 1

A sample of spent Bayer liquor was filtered to remove suspended solids, and then heated to 400° F. in a sealed vessel for 30 minutes. After cooling, the contents of the vessel were filtered to separate the crystallized materials from the filtrate.

The solids were examined by scanning electron microscopy, which revealed them to be irregular agglomerates of smaller crystals with dimensions of ~0.2 to 0.4 microns. A representative micrograph is shown in FIG. 1.

EXAMPLE 2

Figure 2:
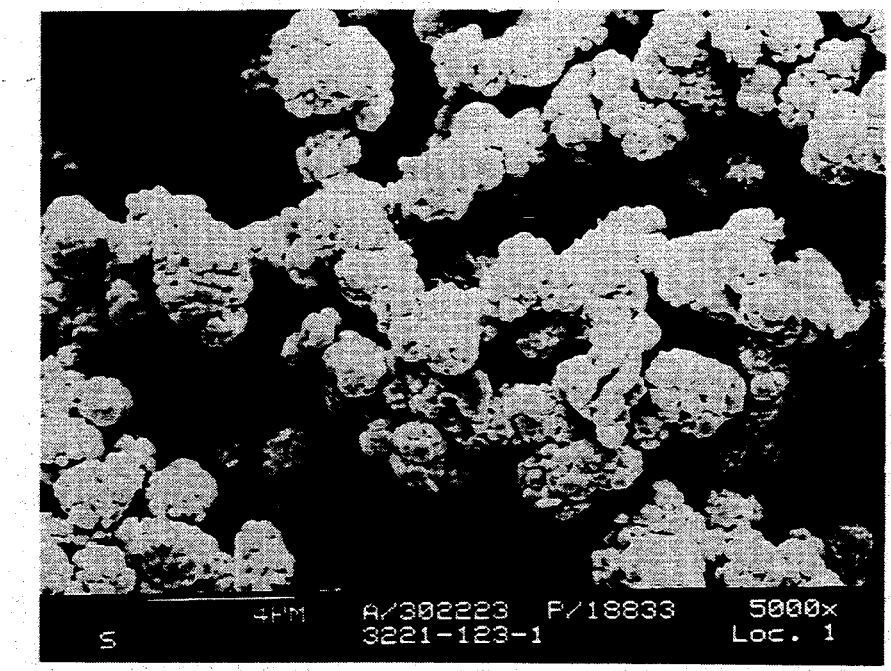
FIG. 2 is electron micrographs of desilication product crystals from precipitation studies conducted with polyDADMAC 100 parts per million at 5,000 times magnification.

A sample of Bayer liquor was treated with 100 ppm of polyDADMAC, having an Intrinsic Viscosity of about 0.7 and average molecular weight of about 100,000 daltons, obtained from the Nalco Chemical Company. The treated liquor was then heated to 400° F. for 30 minutes in a sealed vessel. After cooling, the liquor was filtered to collect the crystallized products. As shown in FIG. 2, examination of the solids by SEM reveals them to be clusters of spheroidally shaped agglomerates. Typical dimensions of the spheroids fall in the range of 1–4 microns.

EXAMPLE 3

Figure 3:
FIG. 3 is an electron micrograph of desilication product crystals from precipitation studies conducted with ammonium acrylate-acrylamide copolymer, 100 parts per million at 5,000 times magnification.

A sample of Bayer liquor was treated with 100 ppm of a copolymer of ammonium acrylate and acrylamide (2:1 monomer ratio and an average molecular weight in excess of 5,000,000 daltons). The liquor was then heated to 400° F. for 30 minutes in a sealed vessel. After cooling, the liquor was filtered to collect the crystallized products. As shown in FIG. 3, examination of those solids by SEM reveals them to be large agglomerates with dimensions in the range of 5–15 microns.

EXAMPLE 4

Figure 4A:
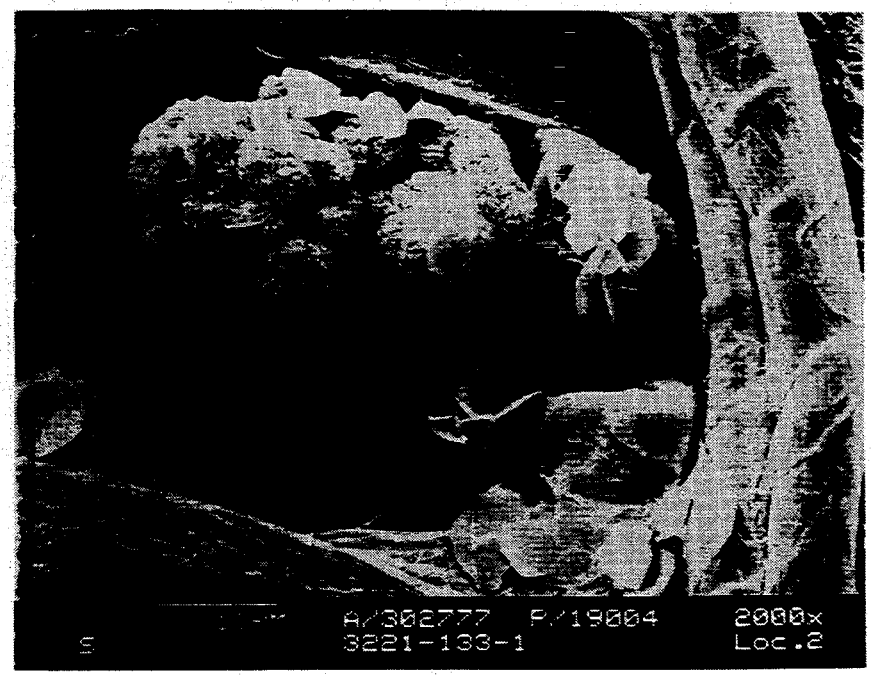
FIG. 4 is electron micrographs of desilication product crystals from precipitation studies conducted in the presence of 100% polyacrylamide, Panel A 100 ppm at 2,000 magnification, Panel B 100 ppm at 5,000 magnification.
Figure 4B:
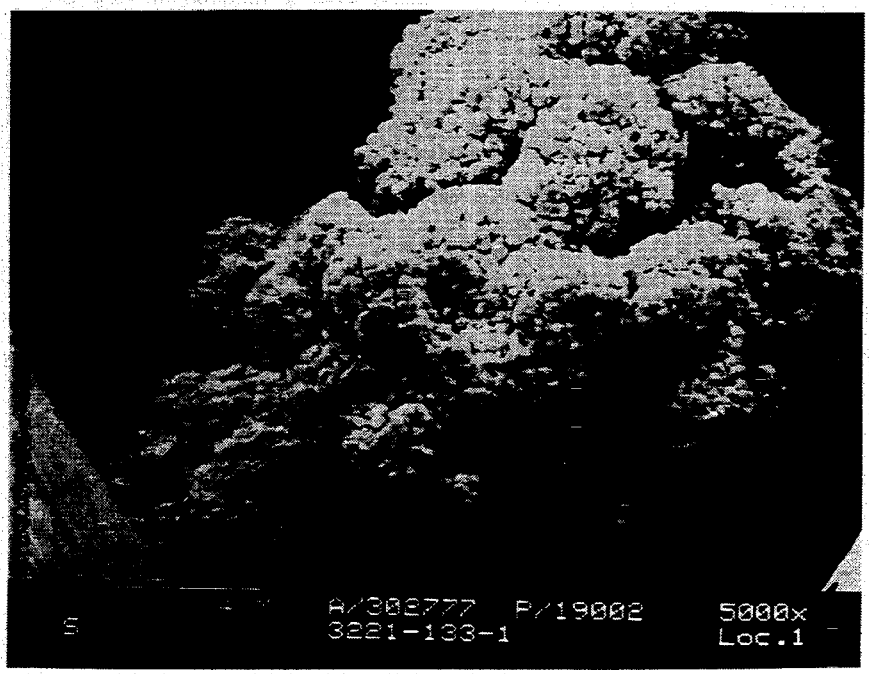

A sample of Bayer liquor was treated with 100 ppm of polyacrylamide, having an average molecular weight of about 8,000,000 daltons, obtained from the Nalco Chemical Company, and then heated to 400° F. for 30 minutes in a sealed vessel. After cooling, the liquor was filtered to collect the crystallized products. As shown in FIG. 4, examination of the solids by SEM reveals them to be large rounded agglomerates with dimensions in the range of 5-35 microns. These agglomerates are composed of smaller crystallites, with dimensions of less than 1 micron.

EXAMPLE 5

A sample of spent Bayer liquor was treated with sodium silicate to raise the soluble silica content to 3.8 grams of $SiO_2$ per liter. The treated solution was then heated to 400° F. for 30 minutes in sealed vessels. After cooling, the liquors were filtered to collect the crystallized solids.

Figure 5:
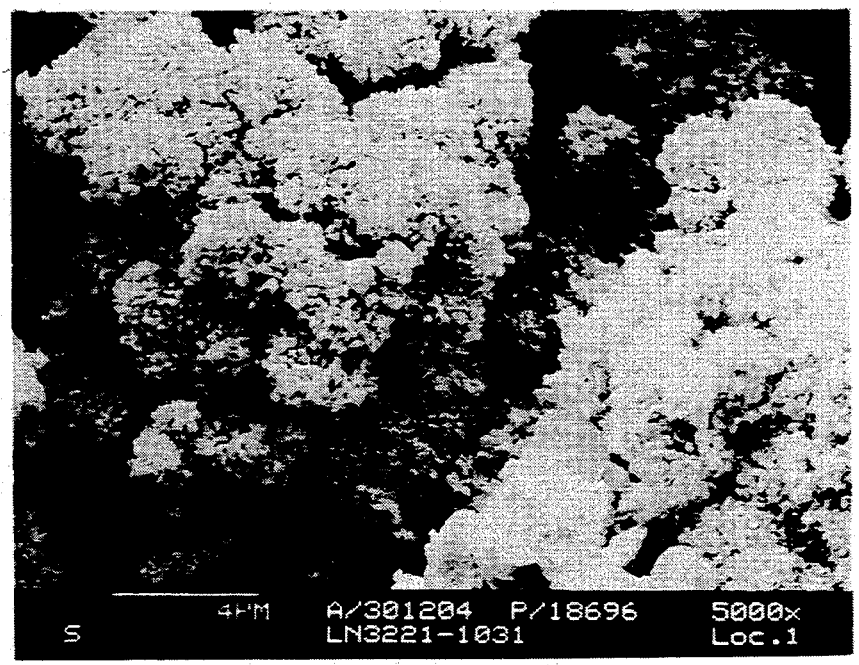
FIG. 5 is an electron micrograph of desilication product crystals from precipitation studies conducted without additives and with a $SiO_2$ spike at 5,000 magnification.

As shown in FIG. 5, the solids which are recovered are irregular agglomerates of indefinite size. These agglomerates are composed of smaller particles with typical dimensions well below 1 micron.

EXAMPLE 6

Figure 6A:
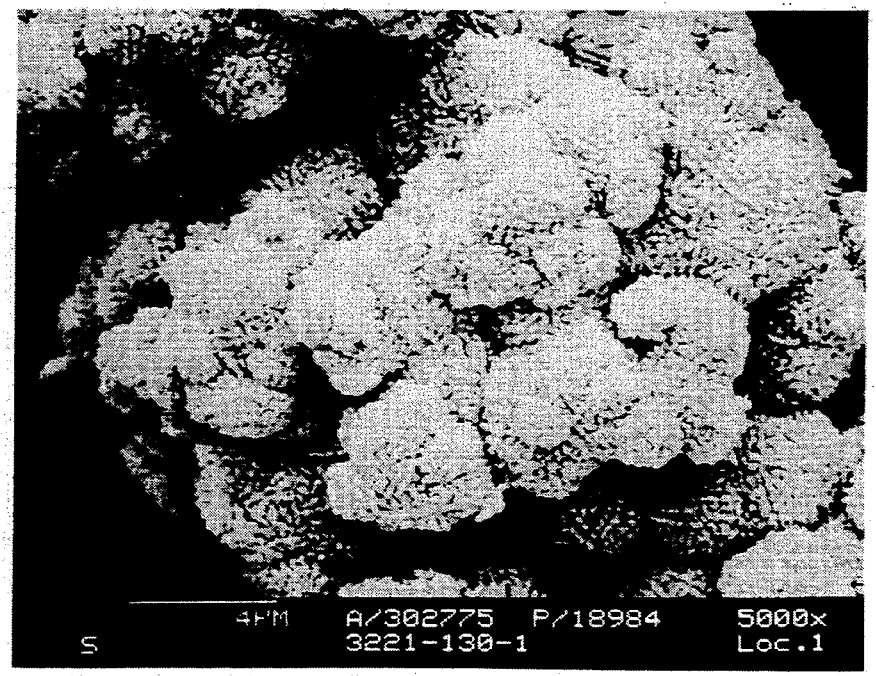
FIG. 6 is electron micrographs of desilication product crystals from precipitation studies conducted with a $SiO_2$ spike and with 100% polyacrylamide, Panel A, 100% polyacrylamide 2,500 ppm at 5,000 magnification; Panel B, 100% polyacrylamide 2,500 ppm at 2,000 times magnification.
Figure 6B:
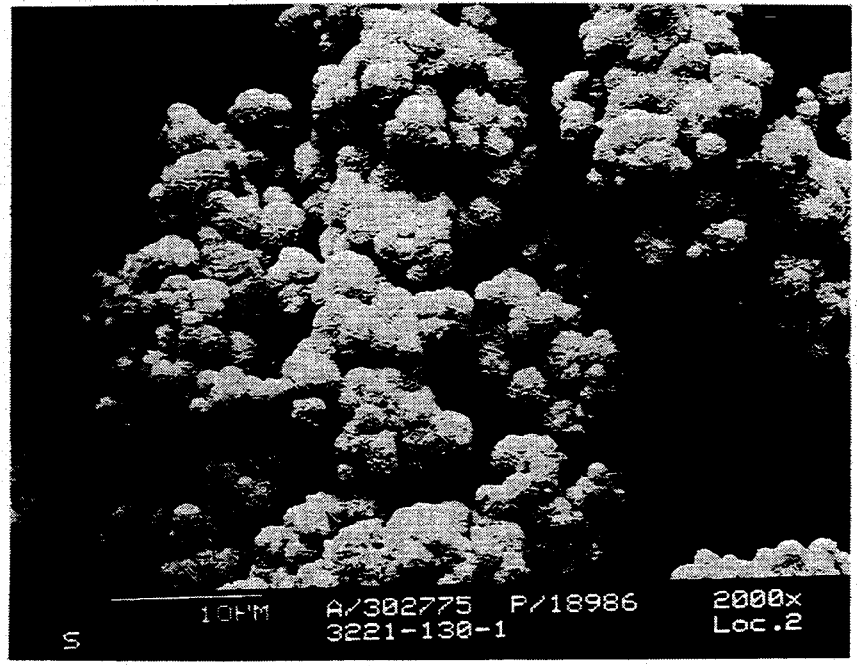

A sample of spent Bayer liquor was treated with sodium silicate to raise the level of soluble silica to 3.8 grams of $SiO_2$ per liter. The liquor was then treated with 2,500 parts of polyacrylamide per million pans of liquor. The treated solution was then heated to 450° F. for 30 minutes in a sealed vessel. The vessel was cooled to ambient temperature, and the contents was filtered to separate the solids from the liquor. As shown in FIG. 6, examination of the solids by SEM reveals them to be composed of spheroidal bodies which have fused to form massive agglomerates. The spheroids are typically 1-5 microns in diameter, and the resulting agglomerates exhibit dimensions of 10-15 microns.

EXAMPLE 7

Figure 7:
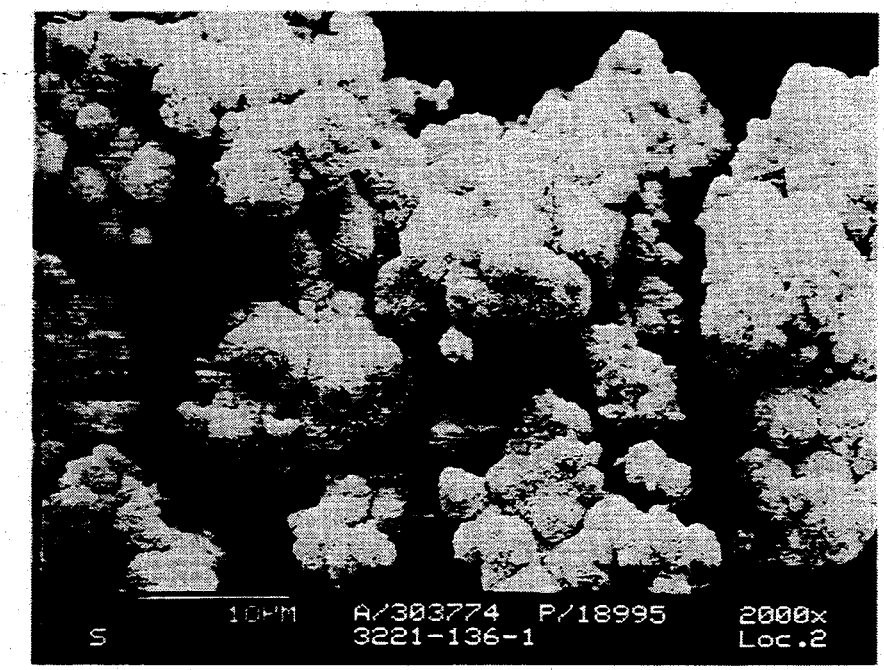
FIG. 7 is an electron micrograph of desilication product crystals from precipitation studies conducted with a $SiO_2$ spike and with EDC-$NH_3$ condensation polymer, 2,500 ppm at 2,000 times magnification.

A sample of spent Bayer liquor was treated with sodium silicate to raise the level of soluble silica to 3.8 grams of $SiO_2$ per liter. The liquor was then cooled to ambient temperature and treated with 2,500 parts of a condensation polymer of ethylene dichloride and ammonia having an average molecular weight of about 30,000 daltons. The treated solution was then heated to 400° F. for 30 minutes in a sealed vessel. The vessel was cooled to ambient temperature, and the contents were filtered to separate the solids from the liquor. As shown in FIG. 7, examination of the solids by SEM reveals the presence of massive agglomerates composed of spheroidal bodies which are fused together. The spheroidal bodies exhibit diameters of 1-5 microns, and the resulting agglomerates exhibit dimensions in excess of 10 microns.

EXAMPLE 8

A sample of the liquor which reports to the heat exchanger after evaporation (see 21 in FIG. 8) was collected and maintained at 80° C. The concentration of dissolved siliceous material in this liquor was 0.89 g of $SiO_2$ per liter.

Three liters of this liquor were heated to 165° C. for 30 minutes in a sealed autoclave with agitation. The liquor was then cooled and filtered to remove the solid which had crystallized. The concentration of siliceous material in the filtrate was 0.80 g of $SiO_2$ per liter.

Another three-liter sample of this liquor was treated with a copolymer composed of acrylic acid and acrylamide having a molar ratio of 70:30, respectively, and having a molecular weight in the range of 25,000-40,000 daltons. The dose of the copolymer was 500 ppm. The treated liquor was then heated to 165° C. for 30 minutes in the sealed autoclave with agitation. After cooling and filtration, the concentration of siliceous material in the filtrate was measured to be 0.89 g of $SiO_2$ per liter.

This demonstrates that the copolymer treatment stabilized the siliceous components of the liquor and prevented their precipitation. This effect on the silica concentration by the copolymer can be used to prevent silicate scale deposition.

Changes can be made in the composition, operation and arrangement of the method of the present invention described herein without departing from the concept and scope of the invention as defined in the following claims.

I claim:

1. A method for inhibiting the deposition of desilication products from spent Bayer Process liquor, wherein said liquor contains dissolved siliceous components, is free of suspended solids, and is subjected to a thermal treatment capable of depositing said desilication products on process equipment surfaces, comprising:
   adding to the spent Bayer process liquor a polymer selected from the group consisting of:
   polyacrylamides having a molecular weight range of from 1,000,000 to 25,000,000 daltons;
   acrylamide/acrylic acid copolymers having a molecular weight range of from 10,000 to 25,000,000 daltons;
   water soluble or dispersible condensation polymers selected from the group consisting of epichlorohydrin-dimethylamine copolymers, and ethylenedichloride-ammonia copolymers having a molecular weight range of from about 5,000 daltons to about 250,000 daltons;
   copolymers of acrylamide with a monomer selected from the group consisting of: methacrylamidopropyltrimethylammonium chloride; dimethylaminoethylmethacrylate, methyl sulfate quaternary; dimethylaminoethylmethacrylate, methyl chloride quaternary; diallyldimethylammonium chloride; dimethylaminoethylacrylate, methyl chloride quaternary; and, dimethylaminoethylacrylate, methylsulfate quaternary; and,
   polydiallyldimethylammonium chloride having an intrinsic viscosity of from 0.1-1.0;
   to provide a concentration of from 10 to 10,000 parts per million of the polymer in the liquor, to inhibit the deposition of said desilication products on said surfaces.

2. The method of claim 1 wherein the polymer added is added in a concentration of from 100 to 5,000 parts per million in the spent liquor.

3. A method of reducing the formation of insoluble siliceous deposits upon Bayer Process equipment during a thermal treatment of spent Bayer Process liquor, wherein said liquor contains dissolved siliceous components, is free of suspended solids, and is subjected to a thermal treatment capable of forming said insoluble siliceous deposits on process equipment surfaces, the method comprising the step of adding a diallyldimethylammonium chloride homopolymer or copolymer with a vinylic monomer, having an intrinsic viscosity of from 0.1 to 1.0 to spent Bayer process liquor prior to or during the thermal treatment in a concentration of from 10 to 10,000 parts per million of the liquor to reduce the formation of said insoluble siliceous deposits on said surfaces.

4. A method of reducing the formation of insoluble siliceous deposits upon Bayer Process equipment during a thermal treatment of spent Bayer Process liquor, wherein said liquor contains dissolved siliceous components, is free of suspended solids, and is subjected to a thermal treatment capable of forming said insoluble siliceous deposits on process equipment surfaces, the method comprising the step of adding an acrylic acid/acrylamide copolymer having a molecular weight of from about 10,000 to about 100,000 daltons to spent Bayer process liquor prior to or during the thermal treatment in a concentration of from 10 to 10,000 parts per million of the liquor to reduce the formation of said insoluble siliceous deposits on said surfaces.

5. The method of claim 4 wherein the copolymer added is added in a concentration of from 100 to 5,000 parts per million in the spent liquor.

* * * * *